United States Patent
Pouyez et al.

(10) Patent No.: US 8,364,300 B2
(45) Date of Patent: Jan. 29, 2013

(54) RETRIEVING AND NAVIGATING THROUGH MANUFACTURING DATA FROM RELATIONAL AND TIME-SERIES SYSTEMS BY ABSTRACTING THE SOURCE SYSTEMS INTO A SET OF NAMED ENTITIES

(75) Inventors: Nicolas Pouyez, Rancho Santa Margarita, CA (US); Keynon Basinger, San Marcos, CA (US); Nicholas Beets, Aliso Viejo, CA (US); Stephane Bischoff, Ile-Bizard (CA); James Eric O'Hearn, Mission Viejo, CA (US); Ravi Kumar Herunde Prakash, Foothill Ranch, CA (US); Patrick Parsy, Rancho Santa Margarita, CA (US); Christian-Marc Pouyez, Laval (CA)

(73) Assignee: Invensys Systems, Inc., Foxboro, MA (US)

( * ) Notice: Subject to any disclaimer, the term of this patent is extended or adjusted under 35 U.S.C. 154(b) by 311 days.

(21) Appl. No.: 12/573,843

(22) Filed: Oct. 5, 2009

(65) Prior Publication Data

US 2010/0161101 A1   Jun. 24, 2010

Related U.S. Application Data

(60) Provisional application No. 61/102,577, filed on Oct. 3, 2008.

(51) Int. Cl.
G06F 17/00 (2006.01)
G06F 3/048 (2006.01)

(52) U.S. Cl. .......................... 700/108; 702/182; 702/187

(58) Field of Classification Search .................. 700/108, 700/111, 174; 702/182, 183, 188, 97, 187; 715/772; 709/202
See application file for complete search history.

(56) References Cited

U.S. PATENT DOCUMENTS

| | | | | |
|---|---|---|---|---|
| 5,801,965 A | * | 9/1998 | Takagi et al. | 702/35 |
| 5,946,661 A | * | 8/1999 | Rothschild et al. | 700/108 |
| 6,381,556 B1 | * | 4/2002 | Kazemi et al. | 702/182 |
| 6,584,369 B2 | * | 6/2003 | Patel et al. | 700/108 |
| 6,826,439 B1 | * | 11/2004 | Barber et al. | 700/108 |
| 7,039,632 B2 | * | 5/2006 | McCormick | 700/19 |
| 7,136,825 B2 | * | 11/2006 | Araki et al. | 700/111 |
| 7,221,991 B2 | * | 5/2007 | Matsushita et al. | 700/110 |
| 7,324,855 B2 | * | 1/2008 | Ushiku et al. | 700/83 |
| 7,380,213 B2 | * | 5/2008 | Pokorny et al. | 700/96 |
| 7,421,351 B2 | * | 9/2008 | Navratil | 702/185 |
| 7,493,236 B1 | * | 2/2009 | Mock et al. | 702/187 |
| 7,529,642 B2 | * | 5/2009 | Raymond | 702/187 |
| 7,596,803 B1 | * | 9/2009 | Barto et al. | 700/108 |
| 7,676,288 B2 | * | 3/2010 | Middleton, Jr. | 700/83 |
| 7,877,233 B2 | * | 1/2011 | Middleton et al. | 702/187 |
| 7,882,438 B2 | * | 2/2011 | Markham et al. | 700/109 |
| 2002/0002560 A1 | | 1/2002 | Shah et al. | |
| 2002/0077715 A1 | * | 6/2002 | Haraburda et al. | 700/97 |

(Continued)

OTHER PUBLICATIONS

International Search Report and Written Opinion for PCT/US2009/059590 dated Apr. 30, 2010.

*Primary Examiner* — Charles Kasenge
(74) *Attorney, Agent, or Firm* — Edward S. Jarmolowicz, Esq.

(57) ABSTRACT

A software agent is described that receives an information request to retrieve information based on a name defined by a configured manufacturing data model. The agent serves the request by relating data coming from one or multiple backend systems and adding contextual data (Metadata). A result set is prepared to correspond to the format and filtering criteria defined in the information request, and the agent produces a response in a normalized format. The response contains the requested data and metadata used for navigation and contextualization purposes. The response in the normalized format is transmitted by the agent synchronously or asynchronously based on criteria specified in the request.

20 Claims, 12 Drawing Sheets

U.S. PATENT DOCUMENTS

| | | |
|---|---|---|
| 2002/0198964 A1 | 12/2002 | Fukazawa et al. |
| 2003/0220809 A1* | 11/2003 | Komine et al. ............... 705/1 |
| 2004/0054660 A1* | 3/2004 | McCormick ................. 707/3 |
| 2005/0119768 A1* | 6/2005 | Retsina ....................... 700/28 |
| 2006/0064188 A1* | 3/2006 | Ushiku et al. ............. 700/108 |
| 2006/0129663 A1* | 6/2006 | Labourier ................. 709/223 |
| 2006/0235706 A1 | 10/2006 | Rodrigue et al. |
| 2007/0255442 A1* | 11/2007 | Nakamura et al. ......... 700/108 |
| 2007/0260410 A1* | 11/2007 | Raymond ................... 702/81 |
| 2008/0027683 A1* | 1/2008 | Middleton et al. .......... 702/187 |
| 2008/0126408 A1* | 5/2008 | Middleton ................ 707/104.1 |
| 2008/0154544 A1* | 6/2008 | Navratil .................... 702/183 |
| 2008/0235611 A1* | 9/2008 | Fraley et al. ............... 715/772 |

\* cited by examiner

RETRIEVING AND NAVIGATING THROUGH MANUFACTURING DATA FROM RELATIONAL AND TIME-SERIES SYSTEMS BY ABSTRACTING THE SOURCE SYSTEMS INTO A SET OF NAMED ENTITIES

FIELD OF THE INVENTION

The present invention generally relates to the field of computerized process control and manufacturing information systems. More particularly, the invention concerns retrieving manufacturing information from multiple diverse data sources in such systems and presenting the retrieved information to users without regard to the actual sources from which the retrieved information was obtained.

BACKGROUND

Industry increasingly depends upon highly automated data acquisition and control systems to ensure that industrial processes are run efficiently, safely and reliably while lowering their overall production costs. Data acquisition takes a variety of forms, including trending and non-trending. Trending data generally comprises the type acquired when a number of sensors measure aspects of an industrial process and periodically report their measurements back to a data collection and control system. By way of example the trending data produced by a sensor/recorder include: a temperature, a pressure, a pH, a mass/volume flow of material, a tallied inventory of packages waiting in a shipping line. If one or more pieces of trending data for a process variable are not stored, they can generally be estimated by observing the values assigned to the variable before and after the lost values, and then interpolating between the points.

Non-trending data, on the other hand, does not follow a pattern from point to point, and therefore cannot be estimated from nearest neighbor data points. Production data identifying general production requests (e.g., create a batch of chocolate milk) and tasks performed within the scope of each general production request, is an example of non-trending data. In view of the inability to estimate the values attributed to lost non-trending data, specialized databases, referred to as production event servers, have been developed to receive and maintain detailed production event histories.

SUMMARY OF THE INVENTION

Methods and apparatuses, including computer program products, are described herein for retrieving and navigating data from multiple manufacturing systems for an Operational Intelligence framework.

In accordance with a first inventive aspect, a software agent receives an information request to retrieve information based on a name defined by a configured manufacturing data model. The agent serves the request by relating data coming from one or multiple backend systems and adding contextual data (Metadata). A result set is prepared to correspond to the format and filtering criteria defined in the information request, and the agent produces a response in a normalized format. The response contains the requested data and metadata used for contextualization purposes. The response in the normalized format is transmitted by the agent synchronously or asynchronously based on criteria specified in the request.

In accordance with a second aspect, a computer system includes a graphical user interface display/controls that support data navigation allowing manufacturing information workers to select a specific element of manufacturing data and see the selected element's context within the manufacturing data model. The computer system graphical user interface provides the manufacturing information worker with a set of controls enabling the worker to navigate manufacturing data using the manufacturing data model in order to refine and relate the data using a navigation user interface.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 5-19 present a set of exemplary user interfaces for a configuration utility for configuring a manufacturing data model in accordance with an exemplary embodiment of the present invention.

DESCRIPTION OF ILLUSTRATIVE EMBODIMENTS

Figure 1:
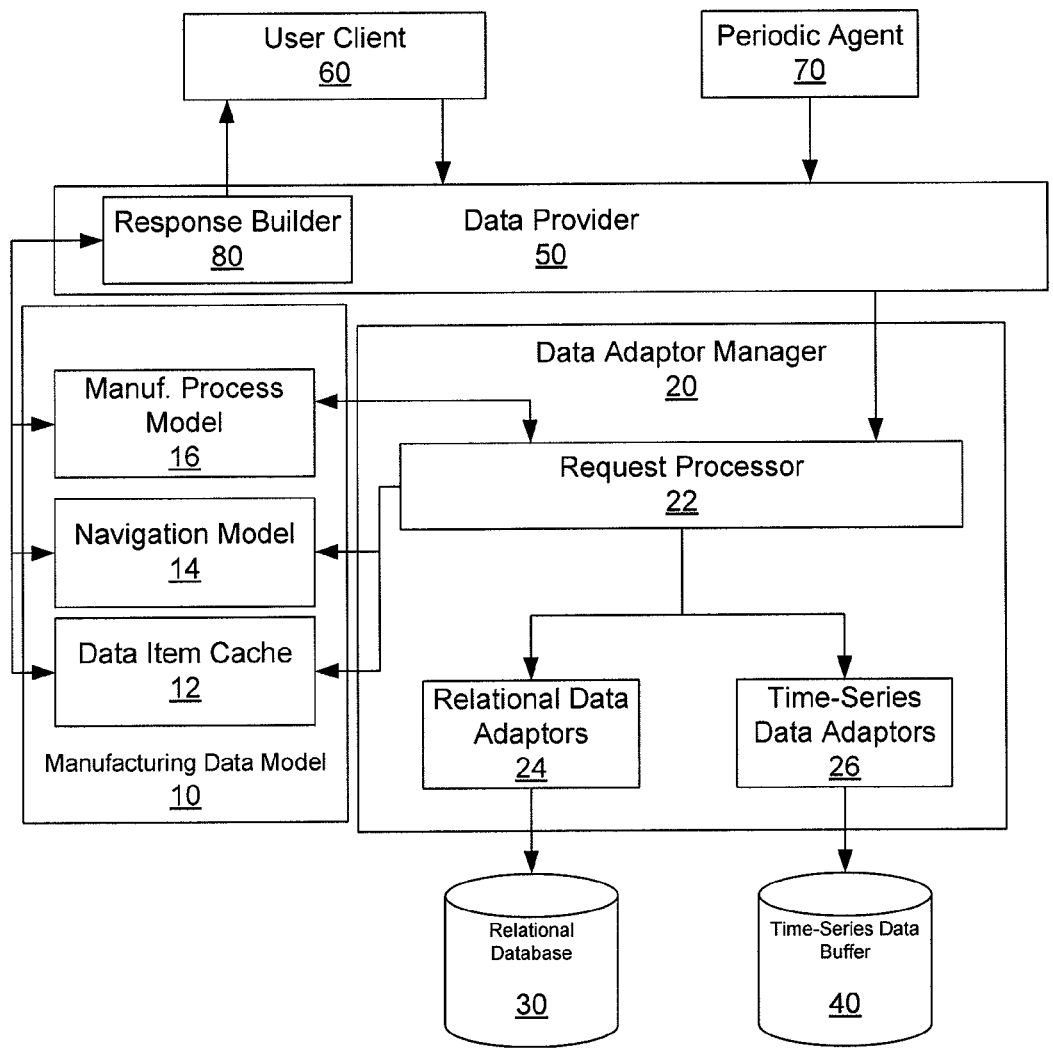
FIG. 1 is schematic diagram showing an exemplary set of computer system components for carrying out an embodiment of the present invention.

The following are definitions of terms relating to the description of the illustrative embodiments:

Aggregate

Aggregation of data is a means to summarize or simplify large volumes of data. A data aggregate is often computed against time, but may also be calculated against any/all applicable contexts. For example, "production count" (for particular manufactured products) aggregate data typically is computed by: time periods, equipment, and product and work order. Aggregate data is referred to herein below as "measures" and/or "measured objects".

Context

All data has context—i.e. additional information that identifies a scope where the data is relevant. For example a metric (such as Equipment Overall Efficiency or "OEE") has context that defines where metric data is relevant such as, for example, over a time range and for a set of equipment. An OEE's value is not applicable to a different piece of equipment or for a different time range. Context is generally specified when retrieving data. However, additional context can be implied on data. For example, a web service data adaptor exposes a current temperature given a zip code. The context of the returned temperature includes a geographic area (e.g., a zip code) for which a returned temperature value is valid (explicitly specified). Moreover, the response implicitly specifies a time for which that temperature is valid. Context data is referred to herein below as "dimensions" and/or "dimension objects".

Context Parameter

Context parameters are fields within a context (dimension/dimension object) that help specify context when retrieving information from data adaptors (see below). Due to a wide range of ways that context can be specified, context parameters are fairly flexible in the way that the parameters are used to define context. From a database point of view, a context parameter enables data to be structured, filtered and summarized. From a functional point of view, such as a web service method, context parameters are used when making a call to the web service method. Use of context parameters is not limited to retrieval of information from data adaptors. Context parameters are also used during execution of transactions or operations. Context parameters are referred to herein as "dimension fields".

Data Adapter

A data adaptor is a provider of data items. In an exemplary embodiment, all data adaptors classes implement an interface, called IDataAdaptor, and the data adaptor classes identify themselves, through a "data adaptor" attribute, as data adaptors to a data server. In an exemplary embodiment, the IDataAdaptor interface provides access to two additional classes: Data Item Browser (IDataItemBrowser), and Data Item Reader (IDataItemReader).

Data Item

A data item is produced in response to a request to a data server or data adaptor. In an exemplary embodiment, the produced/provided data item includes: a name, a value (a complex or simple piece of information), error information pertaining to a request that returned the result, performance information pertaining to the request that returned the result, context for the value (metadata placing the value in context with something else such as, for example, a time frame or location), age of the value defining how new the information is (e.g., on a backend system—how recently the value was updated), a quality value defining a strength of relationships between the data item and other data used to calculate or contextualize the information stored in the value, and metadata and contextual information. Data items are also, in particular instances, referred to herein as "measures", "dimensions", and "source data items".

Metadata

Metadata is additional information attached to information, metrics, and aggregates contained within a manufacturing process model. The purpose of metadata generally depends on data or information to which the metadata is attached.

In typical scenarios metadata: contains a runtime configuration used by display units to specify default behavior or look and feel of the particular display units (e.g. a specific piece of information is best viewed as a chart with a specific configuration); and defines a navigation hierarchy between information sets that enables data navigation on particular received data items.

Metrics

Metrics are a system of parameters or ways of quantitative and periodic assessment of a process that is to be measured, along with the procedures to carry out such measurement and the procedures for the interpretation of the assessment in the light of previous or comparable assessments. Metrics are also referred to herein as "measures".

Turning to FIG. 1, functional components, representing computer-executable instructions executed by physical computer processors, are depicted for an exemplary computer system embodying the present invention. In the exemplary embodiment, functional components of the exemplary computer system are depicted in accordance with a component model.

The exemplary computer system maintains a manufacturing data model 10. The manufacturing data model 10 includes: a data item cache 12, a navigation model 14, and a manufacturing process model 16. The manufacturing data model 10 provides services to backup, restore, archive and purge data maintained within the manufacturing data model 10's aforementioned data item cache 12, navigation model 14 and manufacturing process model 16 sub-components. The manufacturing data model also enforces security with regard to its three sub-components.

The data item cache 12 utilizes data caching (of data from a variety of sources) to allow for faster data retrieval from underlying data sources. Only data items configured to use the data item cache 12 are stored within the data item cache 12. The individual data items within the data item cache 12 potentially include several attributes generally representing characteristics of data represented in the manufacturing data model 10. Data items and their attributes are further described by a set of properties, including but not limited to: data source, data type, units of measure, aliases, cached item, aggregation method, calculation method, etc.

The navigation model 14 stores information describing relationships between all configured data items within the data item cache 12. The navigation model 14 is stored using a network of information describing a path to get from one data item to another as opposed to a relational model between the two data items. The navigation model 14 describes links between data items and qualifies those links. In an exemplary embodiment, the following types of links define a link between two data items:

Is-A
Has-A
Contains-A
Is-Contained-By-A
Is-Composed-Of-A
Consumes-A
Provides-A
Follows-A
Is-Near-A The manufacturing process model 16 contains metadata describing each of the data items in the data item cache 12.

The contents of the data item cache 12 and navigation model 14 are updated by a data adaptor manager 20.

The data adaptor manager 20 centrally manages data adaptors in the server system depicted in FIG. 1. All inter-data adaptor communications go through the data adaptor manager 20. The data adapter manager is responsible for: loading all data adaptors at server startup; relating data item names to data adaptors for all requests on data items at runtime; and inter-data adaptor collaboration.

In the exemplary embodiment the data adaptor manager 20 contains a request processor 22 that provides updated information to both the data item cache 12 and navigation model 14 of the manufacturing data model 10. The request processor 22 bases the updates on: (1) the manufacturing process model 16 of the manufacturing data model 10, and (2) information retrieved from data source specific adaptors including relational data adaptors 24 (for receiving data from relational database sources 30) and time-series data adaptors 26 (for receiving data from time-series data buffers 40).

In an exemplary embodiment, the request processor 22 builds a series of retrieval requests to data sources configured in the system. The request processor 22 analyzes an initially received request-named data item and retrieves from the manufacturing process model 16 all sub-data items that may be required to build the requested data item. A data item can represent either a direct set of data from a specific data source or an aggregate containing multiple data items with links to multiple data sources. The request processor 22 is thus responsible for transforming a request made, either by an agent or a user client, using the abstract representation of the data through Data Items into a series of request to data adapters. In other words, the processor 22 is the component responsible to build the appropriate request to the adapters 24 and 26. The requests to the adaptors are guided by data item configurations (and data) maintained in the components of the manufacturing data model 10. This will determine filter criteria, time period limits and the specific data to retrieve from data sources associated with the adaptors 24 and 26.

Figure 2:
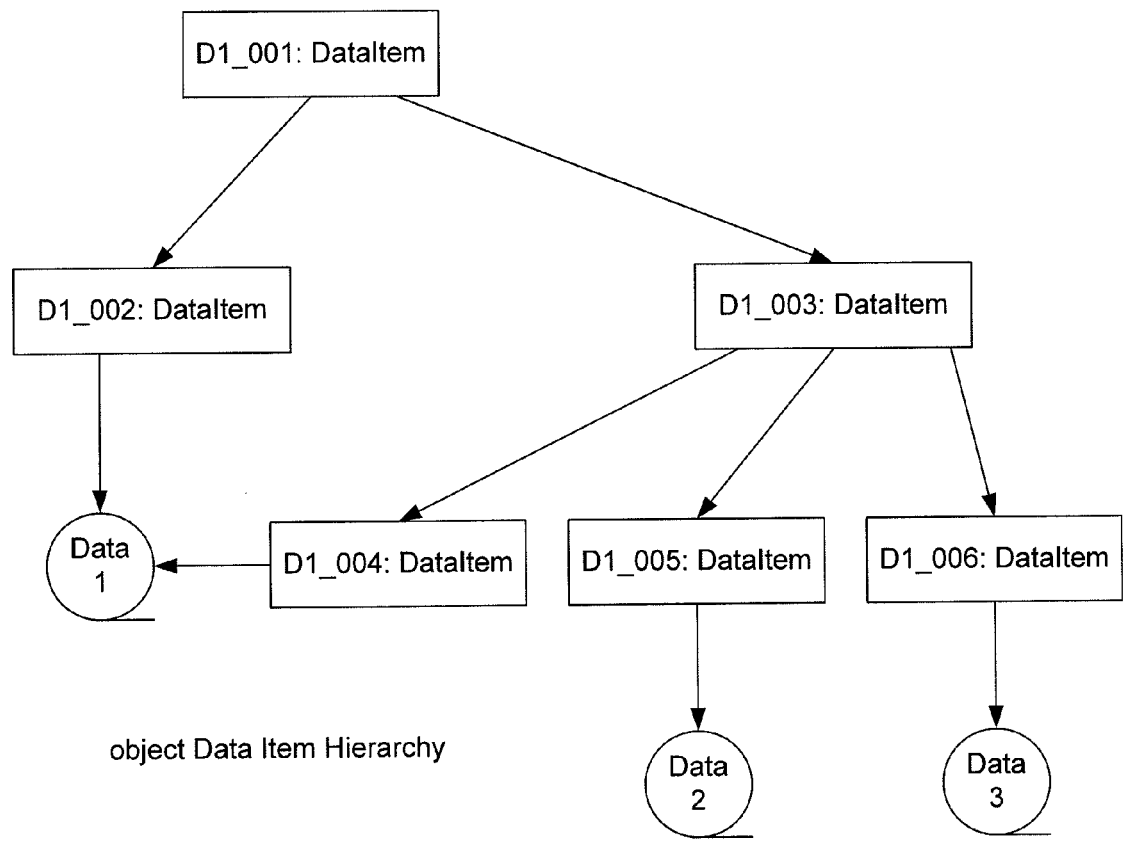
FIG. 2 is a schematic drawing depicting relationships between a set of sub-data items making up a hierarchical complex/composite data item.

The request processor 22 thus supports abstracting data sources and potentially complex data item relationships through a named data item entity (defined in the manufacturing process model 16). As mentioned above, a single data item is potentially a hierarchical structure composed of one or more other configured data items. FIG. 2 schematically represents an illustrative multi-part data item having a hierarchical relationship between sub-data items. The example also provides an example of possible relationships between constituent data items of a hierarchical data item and underlying data sources that provide the sub data items contained in the multi-part data item.

Figure 3:
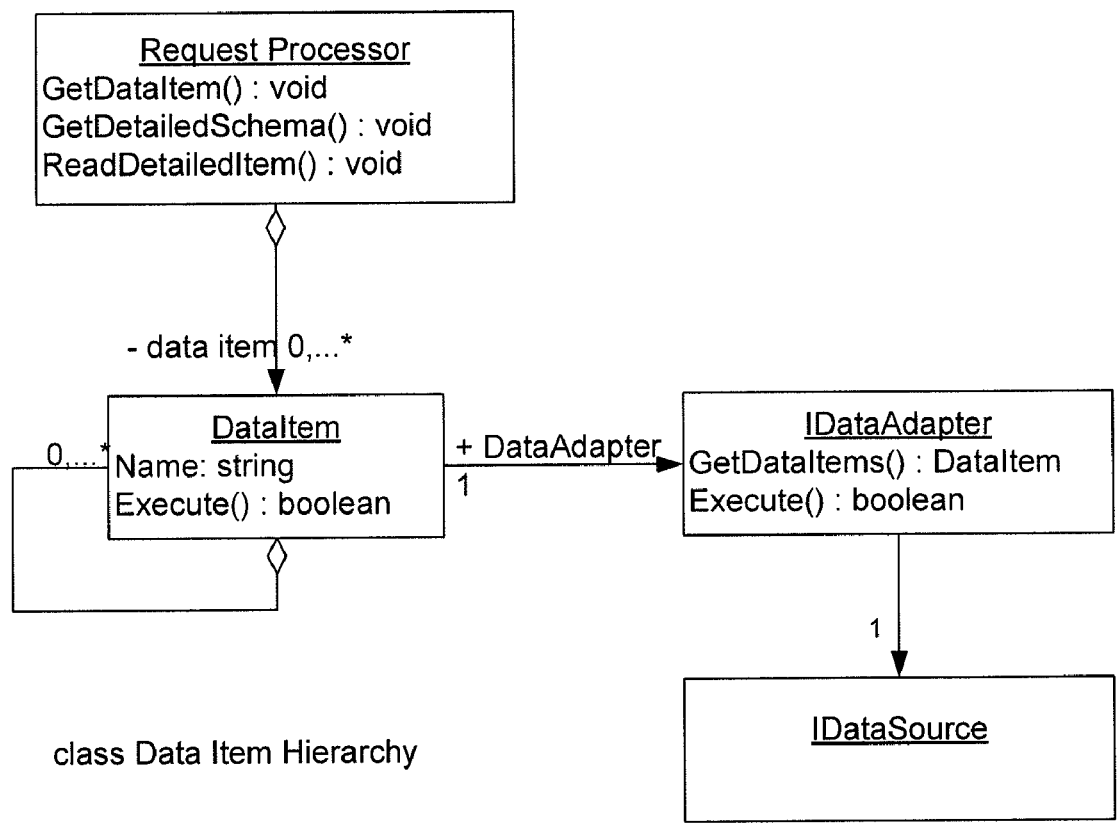
FIG. 3 is a schematic drawing depicting relationships between a set of component objects facilitating retrieval of data by a request processor using a set of specialized data adapters.

In the illustrative embodiment, there is a close relationship between the request processor 22 and the configured data adapters 24 and 26. The data adapters 24 and 26 expose the data of their associated data sources 30 and 40 through data items. The data adapter data items are registered within the request processor 22 at instantiation time. Composite data items (e.g., data items having a hierarchical relationship with other data items) are registered in the same way with the request processor. In other words, a data item can only exist within a data adapter, and execution of the data adapter to retrieve a data item is triggered by the request processor 22. FIG. 3 illustrates the structural relationships between the above mentioned software object components which enables accessibility of data items to the request processor 22.

A data provider 50 component provides a main software interface used to process any client requests for data provided by the relational database sources 30 and time-series data buffers 40. Such client requests are submitted by user clients 60 and a periodic agent client 70. The periodic agent client 70 handles configured scheduled updates to the manufacturing process model 16, navigation model 14 and data item cache 12. The periodic agent client 70 is thus a triggering entity to initiate recalculating a specific area of the manufacturing process model 16 and data item cache 12 of the manufacturing data model 10.

The data provider 50 includes computer executable instructions for accessing, in response to received client requests, the manufacturing data model 10 to retrieve information corresponding to the client requests. Requests by the data provider 50 for data are submitted to appropriate data source components in each of the components' specified "languages" (format, protocol, syntax, etc.). Upon receiving a response from a component, the data provider 50 creates a normalized, source independent, response to the client request.

In the exemplary embodiment, a response builder 80 sub-component creates a normalized response based upon information provided by the manufacturing data model 10. The response builder 80 component packages the data returned by from a processed request along with additional information provided by the manufacturing data model 10 to provide a context for the response (data) to a request. This complete response includes, for example, the relevant data from the manufacturing data model 10 combining a measure (metric/aggregate/calculation) with associated context. In the OEE example, the response builder 80 provides context to a metric (OEE) such as the equipment, shift, team, material that was used, product that was produced during the execution period of a work order—the context data being designated/provided in accordance with the manufacturing data model 10.

The response builder 80 packages the response by the manufacturing data model 10 to a specific request. Building the response is done in several steps described, by way of example, with reference to FIG. 4 (step 140). When the response is ready it is sent back by the data provider 50 to the originator of the specific request associated with the response.

Figure 4:
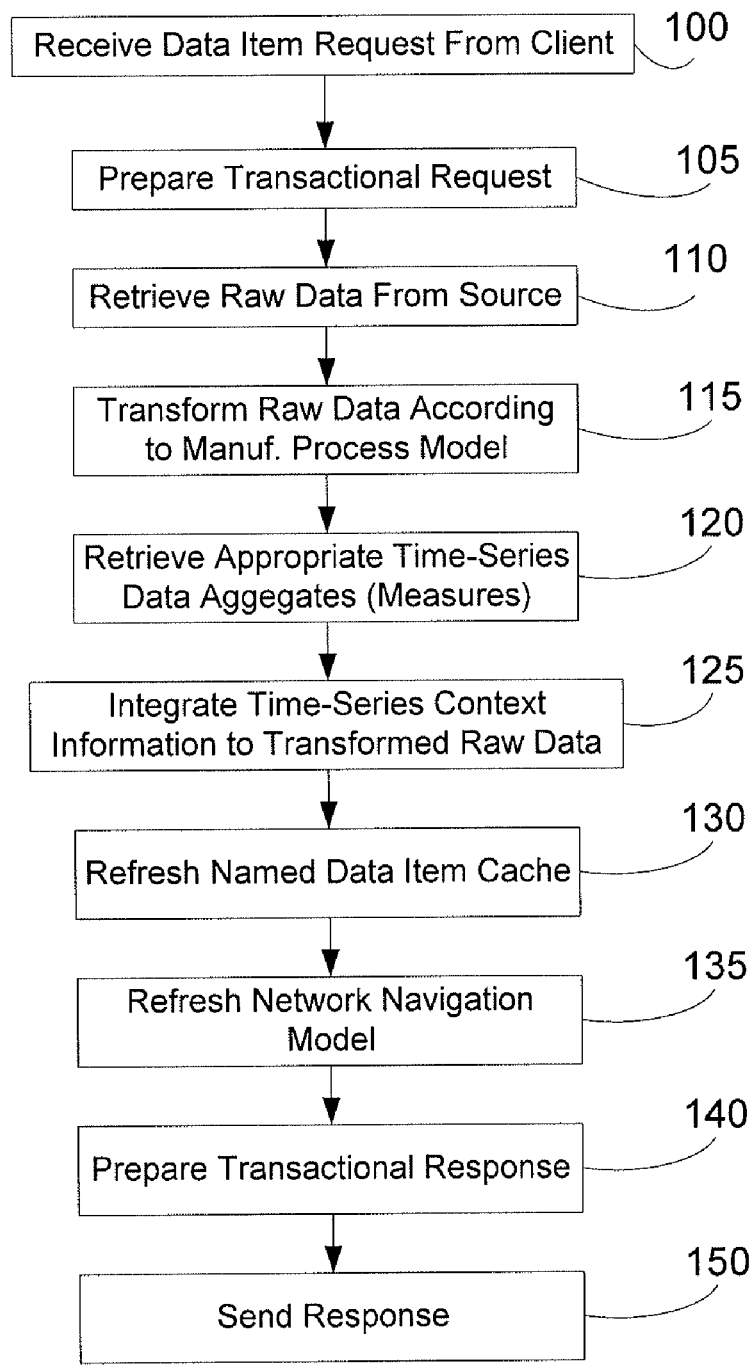
FIG. 4 is a flowchart summarizing a set steps performed by the computer system depicted in FIG. 1 to provide requested data in accordance with an embodiment of the present invention.

Turning to FIG. 4, a set of steps summarize the flow of processing steps in accordance with an illustrative example. Initially, during step 100 the data provider 50 receives a request for a named data item from either the user clients 60 or the periodic agent client 70, and in response the data provider 50 submits a request for the named data item to the request processor 22. Alternatively, the request processor renders data in accordance with a predefined period update schedule. In yet other embodiments the operation of the request processor 22 is invoked by a change to a status/request attribute maintained in the manufacturing data model 10.

In response, during step 105 the request processor 22 prepares a set of transactional requests for submission to the data source systems. Preparing the transactional requests during step 105 includes retrieving, by the request processor 22, relative information (metadata) for the requested named data item from the manufacturing process model 16. Using the metadata, the request processor calculates a set of requests to be executed against: (1) configured raw relational data sources 30, and (2) time-series data sources 40. This step involves changing the data provided by the request (from user or agent) in the form of one or multiple Data Items into a request to the data adapters 24 and 26 with all the appropriate information to execute the request on the data source system. As an example, a request may only contain something like: Data Item=OEE, Work Order=WO_001, Shift="Night". The request processor 22 transforms that request based on the Manufacturing Data Model 10 so it contains the details required for the data source system. This initial request would now look like: Data Item=OEE, Work Order→ From 10/04/2009 at 14:30 to 10/05/2009 at 2h30, Shift→ From 10/04/2009 at 16h00 to 10/04/2009 at 23:59. The data adapters 24 and 26 translate the request processor 22's requests this into the data source language. For example to a SQL Server, the request could look like: "Select field1, field2 FROM thisTable WHERE field3>10/04/2009-16:00 and field3<10/04/2009-23:59". In this last example, the fields are coming out of the data item definition contained in the manufacturing process model 16 which is part of the manufacturing data model 10.

At step 110 the request processor 22 obtains raw data from the relational data sources. At step 115, the request processor 22 transforms the raw data from each of the relational data sources into a predefined manufacturing process model 10 specified structure in accordance with the metadata retrieved during step 105.

During step 120, the request processor retrieves any appropriate time-series data aggregates (measures).

During step 125 the request processor 22 combines/integrates the transformed relational data and time-series raw data. Such integration is also driven by data item configuration information provided by the manufacturing process model 16 for the requested data item. Such integration of multiple data items into a single data item is carried out in accordance with a hierarchical data item definition such as the one described herein above with reference to FIG. 2.

During step 130 the request processor 22 updates an entry in the data item cache 12 corresponding to the data item request received during step 100.

During step 135 the request processor 22 updates an entry in the (network) navigation model 14 (if needed).

Thereafter, during step 140, the response builder 80 of the data provider 50 prepares a transactional response based upon the updated information of the manufacturing data model 10. In the case of a user request, the response builder 80 prepares a response message containing the calculated value(s) for the requested named data-item. The request processor 22 previously added metadata (context) to measures contained in the transaction response. However, in an alternative embodiment the response builder 80 adds metadata provided by the manufacturing data model 10 for the requested data item to the response. In the exemplary embodiment the metadata includes navigation information provided by the navigation model 14 and context data provided along with measure data by the data item cache 12.

In an exemplary embodiment, during step 140 the response builder 80 receives a response of the underlying responding component and determines whether the raw data response to a request for information was successful. Next, the response builder 80 initiates preparing a response message containing the normalized data item information provided by the manufacturing data model 10, and includes the response from the underlying system either in the data portion of the message (if successfully validated) or in the error portion of the message. In the case of an unsuccessful validation of the response to the information request, the response builder 80 sends the response message to the requesting client without further processing.

In the case of successful validation of the initial raw data response, the response builder 80 requests additional data from the manufacturing data model 10, based upon the navigation model 14, to be packaged in a metadata portion of the response message provided by the builder 80. In an illustrative embodiment, only information of a first two levels of navigation for a particular data item returned in the response message will be part of the metadata part of the response message. In other embodiments, any number of navigation information levels is supported in the metadata accompanying a response provided by the response builder 80 in response to a client request.

During step 150, the response builder 80 sends the response containing the requested data in the normalized format to the requesting client (if any) during step 150.

Having described an exemplary system and method of operation of the system for retrieving and providing potentially complex data items via a normalized user interface, attention is directed to a detailed example of processing performed by the request processor 22 to extract data from data sources and build corresponding responses in accordance with a client data item request.

The following generally describes, by way of example, the execution of data requests by the request processor 22 to the data adaptors 24 and 26 according to a configuration specified in the manufacturing process model 16. In the example, a measure is discussed. However, similar processing is carried out to execute defined dimension data items.

When the request processor 22 processes a configured measure defined in the manufacturing process model 16, a start and end time is determined based on a measure period and a measure Start time, or a last request time. The start and end time are used to calculate the measure specific values.

The relationships of the configured measure data item influence time periods specified in requests issued by the request processor 22 for corresponding/related data from the data adapters 24 and 26. As such, once the start and end time for the measure record is computed, time defining relationships, from the manufacturing process model 10, are parsed to find all durations that intersect with a current duration and based on the intersecting durations found. The original start and end time is broken to multiple sub durations for which the configured measure is to be calculated by the request processor 22.

When processing the configured measure the request processor 22:

1. Determines a Start and End time for the current measure period if configured as such;
2. Finds all context relationships for the measure that are time defining contexts;
3. Finds, for each of the time defining relationships, all distinct start and end time values that are within the specified measure period or after the time of the last request for the same measure;
4. Consolidates all the distinct time stamps from each of the time defining relationships to a single set of distinct time stamps; and
5. Slices, starting with the measure start time, the original Measure duration into multiple durations. For example, if five consolidated time stamps (T1, T2, T3, T4 and T5) were found from two time defining relationships, then the measure is split, by the request processor 22, into: (a) Start Time to T1 (>Start Time AND<=T1), (b) T1 to T2, (c) T2 to T3, (d) T3 to T4, (e) T4 to T5, and T5 to T6.
6. Invokes the appropriate one(s) of the data adaptors 24 and 26 for retrieving raw data for computing the configured measure for each of the slice durations identified in (5); and
7. Inserts a measure record in the data item cache 12 (provided thereafter in a response created by the response builder 80 to a requesting client) for each of the slice durations, inserts the appropriate Start and End time for the measure (corresponding to the sliced duration), and adds unique key links to the corresponding Relationship records.

The request processor 22, when producing a data item (for forwarding by the response builder 80 from the data item cache 12) responsive to a client data item request, populates the dimensions (context) for a data item from one or more data sources. The request processor populates each measure (aggregate, expression or metric) from related data sources (time-series data buffers). Measure (aggregate) data is retrieved based on a client request identifying the measure data by name. In the exemplary embodiment the request processor 22 filters data for a named measure by any of the related dimensions (contexts) supported for the named measure (as defined in the manufacturing process model 16) as well as by a time over which the aggregate value is to be calculated by the request processor 22. By way of example, measure (aggregate) calculations are calculated by the request processor 22 using either a configured SQL server scalar-valued function or script expression.

In an exemplary embodiment a client request for a named data item (potentially a complex data item including multiple sub-data items) is associated with a time zone potentially differing from the underlying source(s) of data responsive to the request.

A server system (comprising, for example, the manufacturing data model 10, the data adaptor manager 20, and data provider 50 in FIG. 1), upon receiving a client request for a named data item (and potentially a specified time period), performs the following operations.

1. Extracting Data from Data Sources

When retrieving data from data sources for a specified time period, the server system, converts a time period specified in a client request to a time zone in the data source system. The request is then passed to an appropriate one of the adaptors 24 and 26 that, in response, provide the requested data (over a specified period) to the request processor 22.

2. Filtering and Populating Dimensions (Context)

In an exemplary embodiment, a first record of every dimension is a special "unknown" record. The unknown record is created automatically by the request processor 22 when a dimension table is created. The unknown record has, by way of example, a primary key field aaDimensionNameID equal to 0 and has null values in all user defined fields.

Filtering and populating dimensions (context) includes converting the timestamp data extracted from the data sources to (1) UTC time and (2) an offset based on the specified time zone of the data source.

With regard to a time defining dimension, all time defining fields are stored in UTC time with a data source offset and the local time of the source. Thus, for each time field specified in the dimension (context), a first additional field is included to store a UTC time for the time field (named TimeField-Name_UTC), and a second additional field is included to store an offset field (named aaTimeFieldNameOffset) in a corresponding dimension table. By way of illustrative example, a dimension named "DimensionShift" has following columns:

"ShiftStartTime"
"ShiftStartTime_UTC"
"ShiftStartTime_Offset"
"ShiftEndTime"
"ShiftEndTime_UTC"
"ShiftEndTime_Offset"

In the illustrative example, all runtime execution of the request processor 22 uses UTC time instead of local time.

The request processor 22 transforms the extracted data from the data sources and the converted UTC time data using configured dimension mappings. A dimension can have one or more fields set as key fields (dimension composite key), and each of these key fields is mapped to a field in a data source. A combination of the values in all fields participating in the key field must produce a unique value. When a composite key already exists in a data item dimension, the row data from a data source with a highest priority is used. If the dimension field mapping is set to "skip" then the data source is skipped and a next highest priority data source is used. If the next highest priority data source does not contain a record for the dimension key, then the value is set to NULL. If a dimension field for a data item is not mapped to a specific data source field or configured as a constant value (note that NULL is also a constant), then the dimension field is set to NULL.

A dimension can have one or more links to other dimensions, and each link to another dimension, in effect, adds a column in a current dimension table. the added column name matches the name of a linked destination dimension table surrogate key field. This doesn't create a foreign key constraint. This is done to allow an easy join between linked dimensions.

Filtering transformed data using a configured filter expression comprises applying, for each dimension, the filter expression to received data.

After filtering, the resulting filtered dimension data used to populate a data store (e.g., data item cache 12). Dimension is populated starting on the specified data collection start date and time prior to the deployment date (i.e. back filling). From there forward, the dimension data is refreshed individually based on a configured refresh rate. The scheduled refresh execution is delayed as per a defined refresh offset (ensuring that the data sources have the requested data available for dimension updates). The following refresh logic is applied:

i. If a new record is found in the source it will be created in the data item cache 12.

ii. If a record already exists in the data item cache 12, it will be marked as obsolete and a new record with the newest information retrieved will be inserted in the data item cache 12. The identification of record will be done using the dimension composite key defined at configuration time.

iii. If a record has been removed from the source system, it will be marked as obsolete in the data item cache 12, but it will not be removed.

3. Calculating and Populating Measures

In an exemplary embodiment measures (e.g., aggregates of time-series data) are calculated and stored according to the following assumptions and constraints.

i. Dimensions mapped to a measure potentially contain only one set or no sets of time defining fields (Start Time and End time OR Start Time and Duration).

ii. Existing measure records are updated when a corresponding time defining a dimension's records are updated, deleted or inserted.

iii. If there is no data in a data source system for a specified period then no aggregate value is created by the request processor for that period.

iv. The maximum number of dimension mappings is 30 and the maximum number of calculations is 75 in order to limit the number of columns in the measure table and maintain good performance.

v. There are three types of measure calculations: aggregation, advanced calculation, and scripting calculation. The advanced calculation only uses a SQL server scalar-valued function, and the scripting calculation only uses a script expression defined during configuration of the measure. The input variables of an advanced calculation are aggregations and/or other calculations within a measure object.

vi. If there is no SQL Server file group or the assigned file group does not exist, the measure data uses a default file group, which is primary.

vii. The data update period for a measure is greater than or equal to a measure refresh period. Otherwise the data item cache 12 may lose some measure data for each refresh.

As noted above, a measure table is created on an assigned SQL server file group if it exists, otherwise a default file group is used, which is primary.

As with dimensions, runtime measure execution uses UTC time.

Measures will be populated by the request processor 22 starting on a specified data collection start date and time prior to the deployment date (i.e. back filling). From there forward, new measure values are added at their configured refresh rate. If a measure period is less than a refresh rate, then measure records are created to fill a time span since a last refresh—with the possibility that there will be an open measure record that will not be updated until a next refresh operation is carried out by the request processor 22. If the measure period is equal to the refresh rate, then only one measure record is created. Finally, if the measure period is greater than the refresh rate, a measure record is updated on each refresh until the measure period is satisfied. The scheduled calculation execution is delayed as per a defined calculation execution offset to ensure that the data sources have the data available for the measure calculation. The request processor 22 uses a measure data update period as the time interval to retrieve new data from a data source for each measure refresh.

Populated measures, stored in the data item cache 12, consist of one or more calculated values. Aggregate measures are calculated across each unique combination of related dimension field values and a specified time period (i.e., there are one or more aggregate values for each time period across each unique combination of dimension value). Advanced measurements are calculated using SQL server scalar-valued functions with the input variables of aggregations and/or the other advanced calculations within the measure object. Scripting measurements are calculated using script expression with the input variables of aggregations and/or advanced calculations within the measure object.

In an exemplary embodiment, measures include a dimension-based time-slicing capability. The dimension-based time-slicing capability is configured by adding relationships to time-defining dimensions contains time-defining fields for determining time slices. Time-defining fields consist of either a start time and an end time or a start time and duration and represent absolute time stamps.

There are, for example, two time slicing behaviors, depending on whether a measure is configured with a fixed period or not. For a measure without a fixed period a measure entry is created for every time slice in the time-defining dimensions that occur later than the last measure entry created, and if there are no time-slices, then the last measure entry is updated.

For a Measure with a fixed period: a measure entry is created when there is either a start of a new measure period or a time slice discovered; and an existing measure is updated when either the measure period end time is in the future and no new time slice is discovered or for a given data source and unique dimension relationship value the measure record will be updated within the current refresh period.

When a fixed period is defined and the unit is Month, then each time slice starts at a refresh start time date. The next time slice should be a date time which is augmented by the specified amount of Months. Leap years must also be considered. For example:

1. If the refresh start time is defined as 2012/01/15. (2012 being a leap year). Current date is 2012/03/18;
2. Refresh rate being one week;
3. Period unit being set to Month and period value being 1;
4. Then the first time slice should be set to 2011/12/15 (which is one month prior to the refresh start time—this is the backfill);
5. Second time slice will be set to 2012/01/15;
6. Third time slice will be set to 2012/02/15
7. Fourth time slice will be set to 2012/03/15.

Measure records are calculated based on the time slices defined in a time defining dimension. Once measure records are calculated, the time defining records in dimensions may change which cause time slices to be redefined. Such changes occur when StartTime, EndTime or Duration column values change, and the changes from the past time in time defining dimension records are detected and handled by reprocessing the measure for the updated time duration.

Since dimension record changes cause updating of measure records, in an exemplary embodiment measure records are updated as part of executing updates to dimensions.

A time defining record can change in the following ways:
1. An existing time defining record has changed which results in a modified time slice.
2. A new time defining record has been inserted which results in a new time slice.
3. An existing time defining record has been deleted which results in a deletion of a time slice.

In the three above-identified scenarios, the existing measure records for affected time durations (old and new durations) are recalculated to reflect new durations. If a data source for a measure contains updated values which have changed since the last calculation, the new values are used while the Measure is reprocessed.

Moreover, in an exemplary embodiment, each measure record produced by the request processor includes:

(1) the value of all configured aggregation in a separate column using a unique name (i.e. the calculation name) and the data source it is coming from;

(2) the value of all configured advanced calculation in a separate column using a unique name (i.e. the advanced calculation name);

(3) the value of all configured scripting calculations in a separate column using a unique name (i.e. the script name);

(4) the beginning and the end of the calculation time period in UTC time and local time, along with the server offset. In an exemplary embodiment the fields marking the beginning and end of the calculation period are named as: aaValuePeriodStartTime_UTC, aaValuePeriodEndTime_UTC, aaValuePeriodStartTime, and aaValuePeriodEndTime, and aaServerOffset. Since the time zone of the data source system is stored in the model, the request processor is able to convert between UTC time and local time. The server offset will be server offset for the time when runtime inserts/updates this measure record in the data item cache 12.

(5) A reference value is maintained for each dimension to which a measure relates. The reference value identifies the related dimension's primary key (e.g., a aaDimensionNameID column where DimensionName is the specific name of the dimension). The column names in the measure table for related dimensions should have the same name as the dimension's primary key column (e.g., aaDimensionNameID). However, if a user overloads the dimension relationship by selecting a particular dimension more than once when defining a measure's context, the column name is an alias chosen during configuration of the measure, regardless of whether the user used a default name or a provided one. Each overload of a particular dimension results in an additional column in the configured measure's table.

(6) A timestamp for the time the measure was stored in the system, named as "aaValueTimeStamp_UTC".

With regard to aggregate measures calculated by the request processor 22 from data retrieved from data sources (e.g., data buffer 40), if there is no data for a given period then no aggregate measure value is created for that period. Moreover, the specified time periods used for retrieval of source data are assumed to be in the source data time zone. Finally, each request for an aggregate measure will provide the details on the field to be used to filter on time.

Continuing the description of an exemplary process for calculating and populating the data item cache 12 with measures. Aggregate measure records have a column for each configured dimension relationship. Each dimension relationship column contains a foreign key value to an associated record in the corresponding dimension table. The key values that are used in the dimension columns depend on the configuration of the dimension relationship in the measure. In particular, when a source field is related to the dimension key then aggregates are created for each unique value in the configured source field. The unique values in the configured source field are then associated with a dimension key value in the associated dimension. When the source field value of the aggregate is null or does not exist in the dimension, then the resulting dimension key for the aggregate record in the measure table points to the unknown dimension record. When a constant value is related to the dimension key (note: null is also a constant), then the constant value is attached to all of the aggregates from the source system after the aggregates have been calculated. The resulting dimension key for the aggregate records in the measure table points to the relevant dimension record. If the constant value does not exist in the dimension or is null then the index will point to the unknown dimension record.

Advanced calculations are calculated from input variables. If any aggregated value is null, then the advanced calculation value is null. If any advanced calculation value used as input variable is null, then the advanced calculation value is null. During operation, the request processor 22 also performs any implicit type conversions when needed. Examples of such conversions include: converting a date time field into a string, converting a integer to a float, converting a Boolean to an integer, etc.

In an exemplary embodiment, a configuration application executes on a configuration computer system including a graphical user interface and suitable user manipulated I/O devices (e.g., a mouse, a keyboard, etc.) that enable a user to define a configuration for: dimensions, measures and data sources in the system described by way of example herein above. A first configuration capability supports viewing, creating, deleting, and renaming dimensions, along with mapping data source information to dimensions. A second capability supports viewing, creating, deleting, and renaming data sources (e.g., data sources 30 and 40) along with configuring the connection information for data adapters (e.g., adapters 24 and 26) associated with the data sources. The third capability supports viewing, creating, deleting, and renaming measures. A measure is defined by a function, a time period and relationships to dimensions.

1. Configuring a Data Source

Each configured data source is modeled by object in the exemplary system. When creating a data source, the new data source instance will appear in a listing of configured data sources for the system. Deleting and renaming a data source can be done by renaming or deleting the corresponding configured data source object.

Figure 5:

General Tab (FIG. 5)

In the data source object editor's General tab, a user enters the node name and port number of where a data adapter service is residing. The data adapter type is selectable from a combo box.

Setting the description allows the user to associate text that explains the data source's purpose or intent. Maximum length is 256. All characters are accepted. The following default values are set: Server "localhost" and Port "8732". The Data Adapter Type combo box is populated with all data adapters defined in the DataAdapterTypeDefinition.xml document. Selecting a data adapter type populates the Connection String tab (see, FIG. 6) with the data adapter configuration user-interface provided by the selected data adapter.

Figure 6:

Connection Tab (FIG. 6)

The Connection tab is where the connection setting fields relevant to the selected data adaptor type are configured. The control containing these connection settings is provided by the data adapter type that is selected.

A Data source time zone combo box represents the time zone of the database the data source is referencing. The time zone combo box is populated with all possible time zones, not just those already present on the user's computer. The default value is the user's computer time zone. There is also an entry called Coordinated Universal Time (UTC), for data sources which would be in UTC. The connection tab also contains a Test connection button to verify whether the connection information entered is valid. A 30 seconds timeout is used to limit the amount of time spent on testing the connection. The result of the connection test is shown in a message box. A Get schema button is also available. The Get schema button retrieves the source data items using the data source connection information. If any scripts have been defined, the Get schema button will re-compute the script source data items.

Figure 7:
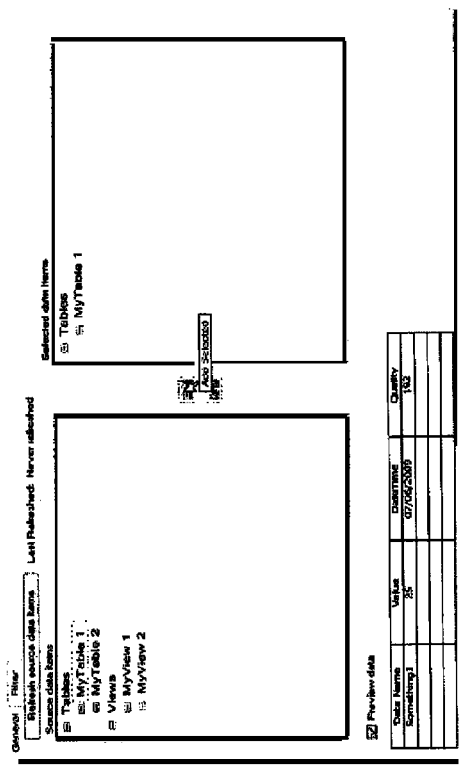

Schema Filtering Tab (FIG. 7)

Data source schema filtering limits the number of source data items available to other data item elements (dimensions and measures) in a Data Source Item Picker for a configured data source. The Schema Filtering tab will display to the user the configured data source's groups and source data items in a tree view control. The ability to preview the data for each of the source data items is provided. Source data items are displayed in a tree view in the way the data adapter returns them.

Figure 8:
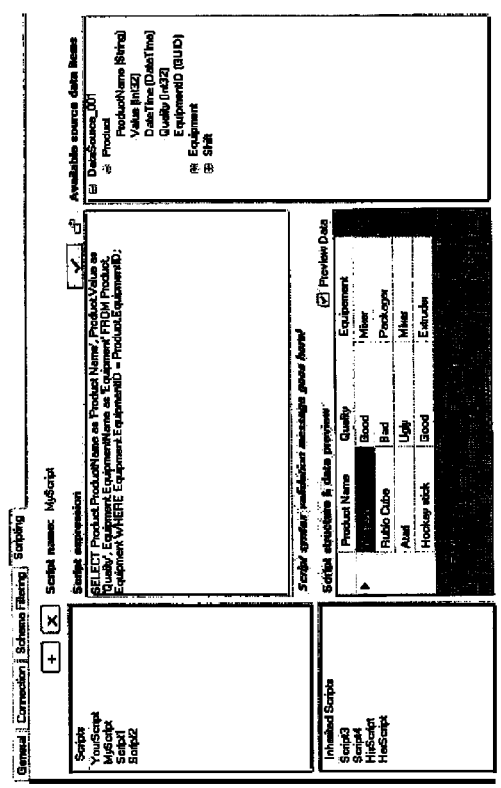

Scripting Tab (FIG. 8)

Because data structures in source systems may not be optimized for the data extraction operations required by the request processor 22, the user is able to create new source data items by using data source scripting. The Source Data Items created using scripting are shown in the same way as other Source data Items in the source data item picker. Data source scripting enables a user to write a request to the source system in order to create new source data items.

When creating a new script, its name must be validated before the user can define it. Script names follow, for example, the known ArchestrA naming convention, but will also consider the SQL Server naming convention, as well as the database restrictions (same as for calculations and metrics). For example:

Only characters valid in ArchestrA are allowed.
The first character of the name must be a letter or an underscore (_).
Subsequent characters can be any valid character in ArchestrA.
Cannot be empty.
Must be unique within the script list.
Its maximum length is 100 characters.
Is case insensitive.
It's not an Intelligence database reserved name.

There is no defined maximum of scripts that can be defined within a data source. The theoretical maximum is the maximum number of items that can go within a list view, which is based on computer memory. Clicking the '+' button creates a new script, while the button deletes the currently selected script. When no script is selected, the 'x' button is disabled.

A script is composed of any expression that the Data Adapter for a configured data source is able to validate. The Script Expression editor is a multi-line textbox. The user can write anything in that editor. To validate her expression, the user can click the validation button, which is mark with a red check. Just like with the data adapter configuration UI, it is the responsibility of data adapters to provide the expression validation. The validation basic statement is that only select statements are allowed. Still, any possible select statement is valid. The user could even trigger user-defined functions. If the expression is not valid, the data adapter will return an error message that is displayed just beside the Script Expression editor.

After the expression syntax has been validated, the expression structure is displayed in the Script Structure & Data Preview window. If the Data Preview checkbox is checked (true by default), pressing the Validation button will also retrieve the top 10 data rows. To accomplish that, it will actually establish a connection to the data source. If no connection can be established, nothing is displayed and an error message notifies the user of the problem. The error message specifies which part of the operation failed. It can be the connection to the data source service, the connection to the source, or the retrieval of the source data item data. The preview window is read only. The only possible action is to sort the columns.

When writing an expression, all source data items from within the current data source are available to the user, no matter if they were filtered out or not using schema filtering. As a reminder/helper, all source data items is displayed in a tree view, at the right of the expression editor. Expanding a source data item will show all its fields, with their type in parentheses. Double-clicking a field will copy it in the Script Expression editor in the format [Namespace].[Source Data Item Name].[Field Name], at the current cursor location, or at the end of the expression if the expression editor never had focus. Double-clicking a source data item will not do anything.

2. Configuring a Dimension

The dimension object represents a configured dimension data item in the manufacturing process model 16. An exemplary set of editor user interfaces ("tabs") are described herein below for defining the attributes of the dimension object. In an exemplary embodiment, the dimension object editor includes "General", "Fields", "Advanced/Time slicing", "Links" and "Filter" tabs.

Figures 9, 10:
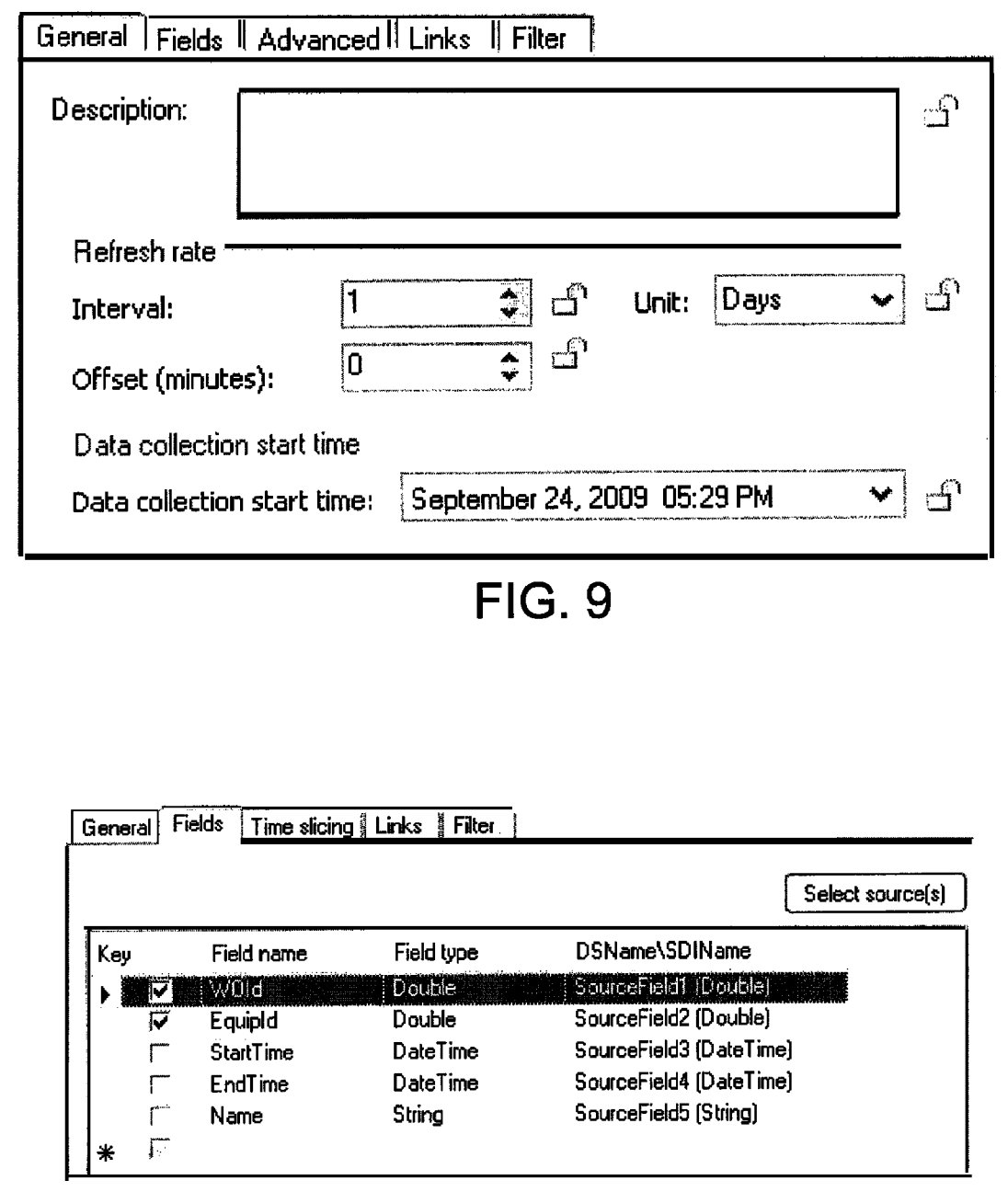

General Tab (FIG. 9)

The dimension object General tab consist of the object description, the refresh rate and data collection start time configuration. Setting the description allows the user to associate text that explains the dimension's purpose or intent. Maximum length is 256. All characters are accepted.

A refresh rate must be specified and allows the user to enter at which time interval the dimension data is refreshed at runtime. The rate is composed of:

A numeric up/down control to specify the interval time. This interval must be a positive integer. The minimum interval that can be entered is 1 minute and the maximum rate that can be entered is 366 days. The default value is 1.

A combo box that lets you select a time unit. The available values in this combo box are, in this order:
Minutes
Hours
Days (default value for the time unit)

A numeric up/down control to specify an offset for the start time which is in minutes. This is a delay applied to scheduled data collection to ensure that the data sources have the required data available. The offset value must be a positive integer with a minimal value of 0 and a maximum value of 59 minutes. The default value is 0.

The user can also specify in the data collection start time group box a start time for when the dimension data collection will start. A date-time picker is used to enter the data collection start time. The default value is the current date at 12:00:00 AM when the measure was created. There's no minimum and no maximum date-time. This is local time, not UTC.

Fields Tab (FIG. 10)

A dimension's field definitions and mapping are done in a grid. The grid contains the following columns:

Composite key: The composite key is a set of fields that uniquely identifies each record in a dimension. The composite key selection is done using a check box available for each field. Each dimension needs to have a key of at least one field. A dimension cannot have more than 8 key fields.

Field Name: of type string, it contains the name of the field. The Field name must be unique, cannot be empty and the maximum length is 100.

Field Type: This is a combo box that cannot be edited or left blank. The default value is string. Data types are sorted alphabetically. Supported types include: Boolean, Byte, DateTime, Decimal, Double, Int16, Int32, Int64, Guid, and String.

Source Data Item Field: This is an editable combo box that contains all fields from the selected source data item. Source data item fields are identified by their name and their type in parentheses. The source data item fields are the actual piece of information that is mapped to dimension fields. Default value is <NULL>. This value can be selected in the combo box at all time. There can be one or more source data item fields, and a dimension's field that is part of a composite key can be mapped with a NULL or a Constant value as long as at least one of the fields of the composite keys is mapped to a source data item field. A Dimension's field that is part of a composite key cannot be mapped with <Skip>.

By editing the combo box, a constant value can be defined for that field. A validation is done to make sure the constant type is compatible with the field type. If the dimension field's data type is of type string and its mapping is replaced by a constant value, then this constant value is put between quotes when saved into the model 16. Another value that can be set to the Source Data Item field combo box is <Skip>. This will enable the processor 22 to understand that a higher priority data source is skipped, and the next highest priority data source is used.

Figures 11, 12:

Advanced/Time Slicing Tab (FIG. 11)

The advanced tab is where the time-slicing and the incremental update are enabled and configured for dimensions. For time-slicing purpose, it is possible to configure a dimension as a time-defining dimension. This configuration consists of a refresh period and a start time field along with an end time field or a duration. It is only possible for the user to choose either an end time field or duration.

Combo boxes are used to define the start time and the end time. They are populated with date-time fields from the dimension, but no field is selected by default. If no date-time fields exist in the dimension, the combo boxes are empty. However, an empty value is considered as invalid.

The duration of a time slice is set using a combo box. By default, this combo box is empty. This combo box will contain all of the numeric dimension fields (Int16, Int32, Int64,). The user is able to choose a field from the combo box or enter a numeric constant value. Validation for duration will verify that the value is a valid numeric dimension field or a positive integer with a maximum value of 366 days.

The duration is also composed of a combo box that lets the user select a time unit. The available values in this combo box are, in this order: Seconds, Minutes, Hours, Days, and Week. By default, a dimension is not marked as a time-defining dimension. The user needs to enable a check box to do so.

From the Advanced tab, the user can also configured the incremental update by specify a start time for when the dimension data collection will start. The user then needs to specify a field to which the start date is applied.

By default, the Enable incremental update group box is disabled. A date-time picker is used to enter the data collection start time. The default value is the current date at 12:00:00 AM when the dimension was created. There's no minimum and no maximum date-time. This is local time, not UTC. For the dimension fields combo box, it will only be populated with date-time fields defined in the Fields tab.

The Update Period is a value picker that allows the user to define the time interval for which new data is retrieved every time the dimension refreshes. It's applied to the selected field in the Field for data backfill combo box. The minimal period of time you can select is 1 minute and the maximum is 366 days. The refresh period should always be equal or higher than the dimension's refresh rate.

The refresh period is composed of a control that lets you enter a positive integer and a combo box that lets you select a time unit. The available time unit values are, in this order: Minutes, Hours, Days, Weeks, and Month. The following default values are set: data update period interval is 1, and data update period unit is Hours.

Dimension Filter Tab (FIG. 12)

A dimension filter functionality filters out data from the source before it populates a dimension in the data item cache 12. The dimension filter is configured from the Filter tab. A dimension filter can be defined by building a filter expression using the configured dimension fields and available expression operators. The Dimension Filter editor supports the user entry, double-click operation for adding dimension fields (including "[" and "]") and single-click to add expression operators to the filter expression canvas. The use of open and closed parenthesis (..) is supported for defining sub comparison expressions and the use of single quotes 'AbCXYz' is supported as string delimiters.

The following operators are supported in the exemplary Filter Expression editor: =, >, <, !=, <=, >=, AND, OR, LIKE, NOT, IN, and IS NULL.

The Dimension Filter editor will validate the syntax of the filter expression. In addition to the operators provided in the Filter Expression editor, the user is able to write any syntactically valid SQL WHERE clause.

Figure 13:
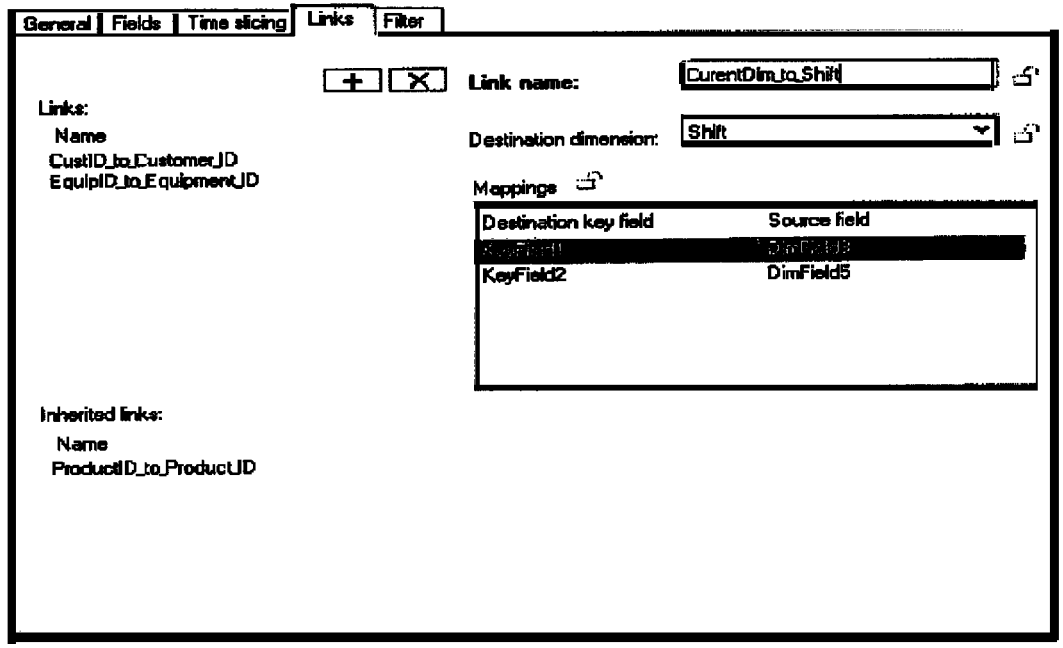

Dimension Links (FIG. 13)

A dimension link is a mapping between two dimensions. These links will help the user in defining inferred relationships from a measure to a dimension when in the measure editor. Dimension links are defined in the "Links" tab. The links list contains the dimension links configured in the current dimension. It is possible to add or delete a link from the link list by using the + and x buttons accordingly. The inherited links list contains the links inherited from a template. When adding a link, a name should be entered to identify the link. By selecting the link in the list the user can configure the other fields:

Link name: Friendly name for a link. Displayed in a text box. The name must be unique within the dimension.

Destination dimension: Name of the dimension to relate to. Contains the list of existing dimensions. Displayed in a read-only combo box. No dimension is selected by default. However, an empty value is considered as invalid.

A grid is used to allow the user to map destination key fields to the current dimension fields, this grid won't allow adding and removing of rows or columns. The grid content is displayed in the two following columns:

Destination key field: This column contains the destination fields to map to the current dimension fields; it's automatically filled depending on the selection made in the destination dimension combo box. It will contain one row for each of the key fields within the selected destination dimension. This column cells are read-only.

Source field: List of fields of the current dimension. Displayed in a read-only combo box. No field is selected by default. However, an empty value is considered as invalid.

3. Configuring a Measure

A measures object defines a measure in the manufacturing process model 16. In an exemplary embodiment, a measure object is defined by one or more functions (see calculations tab described herein below), a period, and mappings to dimensions and source data items. Like dimension objects, it is possible to enter a refresh rate for a measure object in the manufacturing process model 16. The exemplary measure editor interface provides the following tabs: General, Context, Calculations and Filter.

Figure 14:
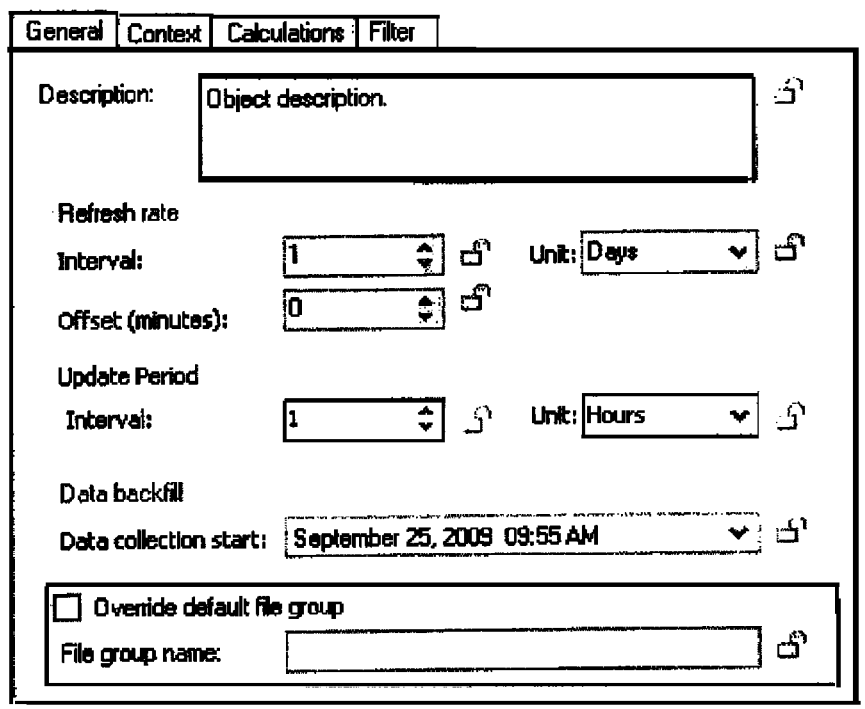

General Tab (FIG. 14)

The General tab supports specifying the name of the measure followed by a description, the refresh rate, the data collection start date time and the file group name. Setting the description allows the user to associate text that explains the measure's purpose or intent.

Setting the refresh rate allows the user to specify at which time interval the measure data is refreshed at runtime. The rate is composed of:

A numeric up/down control to specify an offset for the start time which is in minutes. This is a delay applied to scheduled data collection to ensure that the data sources have the required data available. The offset value must be a positive integer with a minimal value of 0 and a maximum value of 59 minutes. Default value is 0.

A numeric up/down control to specify the interval time. This interval must be a positive integer. The minimum interval that can be entered is 1 minute and the maximum rate that can be entered is 366 days. Default value is 1.

A combo box that lets you select a time unit. The available values in this combo box are, in this order: Minutes, Hours, and Days. The default value is days.

The Update Period is a value picker that allows the user to define the time interval for which new data is retrieved every time the measure refreshes. The minimal update period you can select is 1 minute and the maximum is 366 days. The update period is composed of a control that lets you enter a positive integer and a combo box that lets you select a time unit. The available time unit values are, in this order: Minutes, Hours, Days, Weeks, and Month. The following default values are set: Update period interval is 1 and Update period unit is Hours. A user can also specify in the backfill group box a start time for when the measure data collection will start. A date-time picker is used to enter the data collection start time. The default value is the current date at 12:00:00 AM when the measure was created.

The user is able to override the data store default file group. File groups are used to support database growth in SQL Server 2008. The "Override default file group" option is disabled by default. Enabling it allows the user to set a file group in a text box. This file group is used when creating the measure in the SQL Server data store. If the option is disabled it means that the default file group is used.

Figure 15:
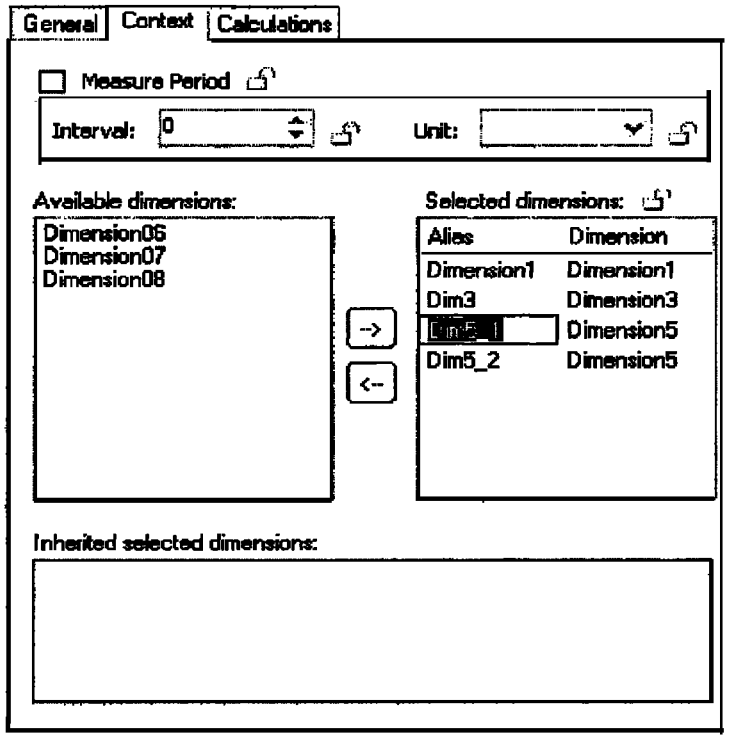

Context Tab (FIG. 15)

A measure's context is defined, in an exemplary embodiment, by two elements: the measure period, which is optional, and its relationships to dimensions. The following default values are set: Period Check box is checked, Period Interval is 1, and Period Unit is hour. The period is a value picker that allows the user to define the time interval of the measure calculation. The minimal period of time you can select is 1 minute and the maximum is 366 days. The period is composed of a control that lets you enter a positive integer and a combo box that lets you select a time unit. The available time unit values are, in this order: minutes, hours, days, weeks and month.

If the period interval is disabled and no TDD dimension is part of the relationships, then a warning is shown to the user when the measure is saved. This warning will indicate that the Measure won't be able to calculate data since no time slicing is available.

The dimension relationships (of measure's context) are created by selecting available dimensions listed on the left and using a merge gadget (an arrow pointing to the right) to move the selected dimension into the right display area. Selecting a dimension on the right and using the removal gadget (an arrow pointing to the left) will remove a dimension relationship.

An alias can be assigned to the selected dimensions. This is especially useful when a dimension is selected more than once. By default, the alias name is set to the dimension name. When selecting a dimension more than once, the default alias name is the dimension name plus a sequential number. For example: "Dimension_1 and Dimension_2".

Aliases must be unique within a measure (Inherited dimension aliases included). The alias name cannot start with the reserved "aa" characters. Only the Alias column can be edited.

The inherited selected dimensions list contains the selected dimensions inherited from a template. The inherited selected dimensions are listed with their alias name and original dimension name.

Figure 16:
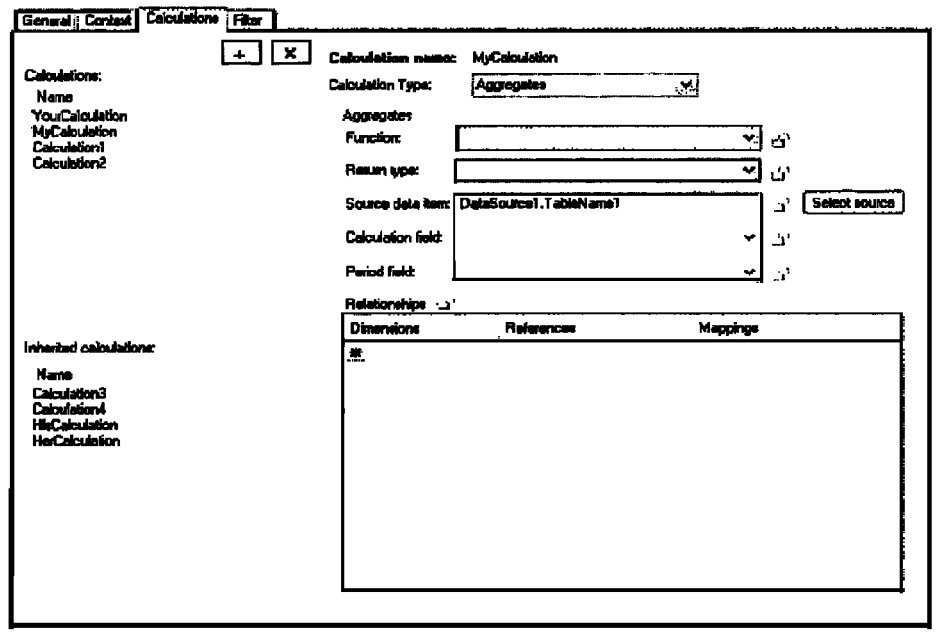
Figure 17:
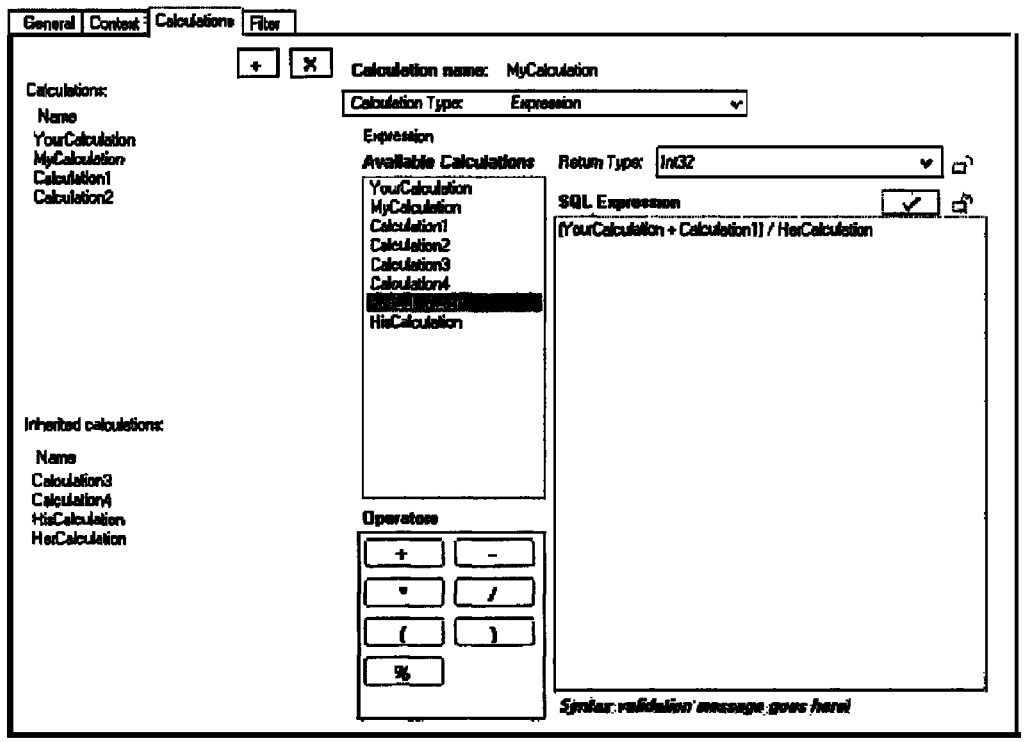
Figure 18:
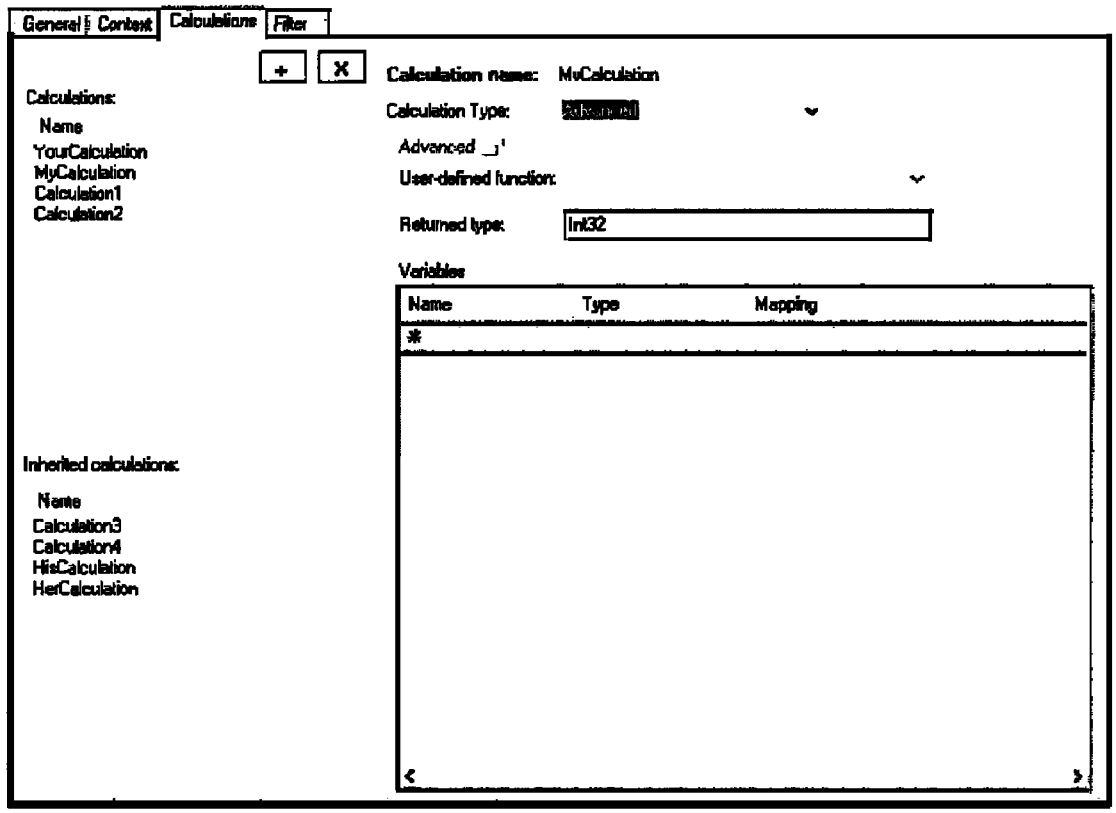

Measure Calculations (FIGS. 16, 17 and 18)

Calculations are defined in a calculations tab having a differing user interface based upon the type of measure defined for the measure object. In an exemplary embodiment, there are 3 types of measures/calculations: Aggregates, Advanced and Expression. Aggregates execute a single operation on a single field, while Advanced calculations retrieve a user-defined function. With the Expression calculation, the user can quickly write arithmetic expressions using existing calculations. The calculation types are selected through a combo box. Selecting an item in the combo box changes the displayed calculation editor. All three calculation editors are explained with reference to their unique configuration user interfaces depicted, by way of example, in FIGS. 16, 17 and 18.

Aggregates Tab (FIG. 16)

The Aggregates editor is composed of a function, a return type, a source data item, a calculation field, a period field and dimension relationships.

The function is used to define measure mappings. The function combo box cannot be edited or left blank. The default value is Sum. Functions are sorted alphabetically. The following is an exemplary list of supported functions: Average, Count, Max, Min, and Sum.

The return type of the function is defined with a combo box that cannot be edited or left blank. The default value is Double. Data types are sorted alphabetically. The following is an exemplary list of supported types: Boolean, Byte, Date Time, Decimal, Double, Int16, Int32, Int64, String, and Time Span.

Clicking the Select Source button will open the Source Data Item Picker. It allows for source data items (SDI) selection, which are the pieces of information used by the measure function. Selecting a source data item will populate a label beside the Select source button as well as the Calculation field and Period field read-only combo box with all the items/fields within the selected source data item. Source data item fields are identified by their name and their type in parentheses.

The Calculation field supports defining measure mappings to the fields that the function will use. The Period field supports defining the source data item fields on which the period is applied.

The Relationships grid enables the user to define context for the Measure by using relationships. There are three types of relationships:

A key relationship defined by associating a key field of a dimension with a field of a source data item. This is established by choosing a field on the dimension that is its key or is part of a composite key.

A dimension link relationship defined with links existing between dimensions. This is established by choosing a field on the dimension that participates in a relationship with a field on another dimension.

A time-based relationship defined between a time-defining dimension and a date time field. This date time field is contained in another dimension or in the source data item used by the calculation.

By way of example, a single grid is used to define the relationships of an aggregate calculation. The grid contains three columns:

Dimensions: The list of all selected dimensions. Displayed in a read-only combo-box.

References: The list of all possible sources to create a relationship. It is displayed in a read-only combo box. After a dimension is selected, it is automatically populated with: all the key fields of the dimension—identified using a key icon; all dimension links of the dimension—identified using a link icon; and if the dimension is time-defining, it will contain a "time-based" entry—identified using a clock icon labeled TIME.

Mappings: The list of all source data items available (displayed in a combo box). If the selected source is a dimension key, it will contain the fields of the source data item selected for the calculation. By editing the combo box, a constant value can be defined for that relationship. A validation is done to make sure the constant type is compatible with the dimension key type. If the selected source is a dimension link, the combo box is read-only and will contain the name of the other dimension involved in the link. If the selected source is time-based, it will contain all the datetime fields of the source data item selected for the calculation and all datetime fields of all other selected dimensions. In this case, the combo box is read-only.

The number of relationships that the user must configure for a calculation corresponds to the number of fields that define the dimension's composite key.

For example, a dimension with three key fields will involve three different references. Therefore, three rows are automatically generated in the relationships grid if this dimension is part of the measure's context.

Expression Tab (FIG. 17)

To enable a user to define metrics by specifying a simple expression, the Expression calculation type is supported by the exemplary configuration editor to allow the user to define calculations using SQL arithmetic operators. The user can double-click the existing calculations in the Available Calculations list (which only includes aggregations having a numeric return type defined within the measure) or click the operators buttons to create her expression. When doing so, text is entered at the current cursor location, or at the end of the expression if the expression editor did not have focus. The user can also type freely in the expression editor.

The return type of the function is defined with a combo box that cannot be edited or left blank. The default value is Double. Data types are sorted alphabetically. The following numeric types are supported: Byte, Decimal, Double, Int16, Int32, and Int64.

The validation of the SQL expression is done through a regular expression. The only valid inputs are the calculations defined in an Available Calculations list and the defined operators. When saving a measure, only the currently selected calculation type editor is saved. Any other configuration done with other editor is lost.

Advanced Tab (FIG. 18)

Advanced calculations are used for computations based on data available in configured Data Source objects or existing Calculations within the same Measure object. Clicking the + button creates a new metric, while the x button deletes the currently selected metric. When no metric is selected, the x button is disabled.

The Advanced editor is composed of a user-defined function, returned type and mappings between variables and calculations. The User-defined function combo box is populated with the list of existing user-defined function. This will happen when accessing the combo box for the first time. To later refresh the list, the measure editor will need to be close and reopened.

The list of user defined functions is made of all scalar-valued functions defined within the Intelligence database. Clicking the refresh button beside the user defined function combo box will update the content of the combo box, but also the stored list. The return type is defined by the selected user-defined function. It is shown in a read-only textbox. Possible types are the following: Boolean, Byte, Date Time, Decimal, Double, Int16, Int32, Int64, String, and Time Span.

For each variable (input parameter) in the selected user-defined function, a row is created in the Variables grid. This grid is made of three columns: Name, Type and Mapping. The Name and Type columns are read-only and represent the name and type of the variable. They get populated from user defined function metadata. The Mapping column is a combo box that includes all aggregate type calculations defined within the measure. The presentation format is the name of the calculation with the return type in parentheses: MyCalculation01 (Int32). By default, the Mapping column is empty. Not selecting a mapping or selecting a calculation which return type is not compatible with the variable type will generate a validation error.

Figure 19:
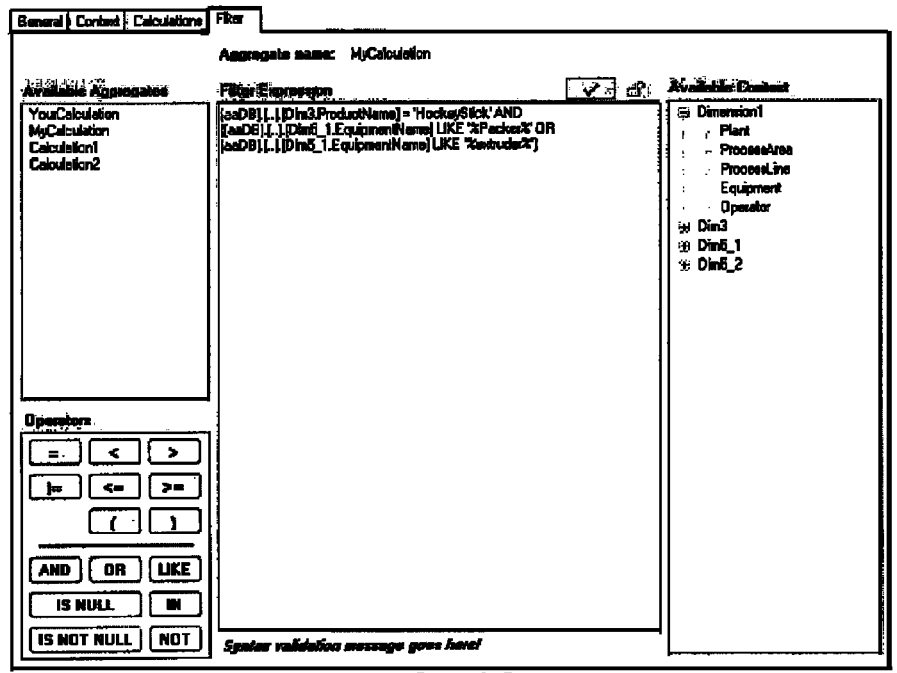

Measure Filter Tab (FIG. 19)

The measure Filter tab provides a means to filter out data from the data source before it populates a measure in a data store, such as the data item cache 12. The measure filter defined for a measure only applies to aggregate type of calculations. One filter can be defined for each aggregate. In an alternative embodiment, the measure filter is not configured from the Filter tab, but rather from the Calculation tab for an aggregate type measure object editor. Integration of both editors is done through collapsible regions.

Measure filtering is defined by building a filter expression using dimension fields. The Available Context list contains dimensions defined in the context.

The Filter Expression editor supports user entry, double-click operation for adding dimension fields (including "[" and "]") and single-click to add expression operators to the filter expression canvas. The use of open and closed parenthesis (..) is supported for defining sub comparison expressions and the use of single quotes 'AbCXYz' is supported as string delimiters. As an example, double-clicking a dimension would have the following result in the expression editor: [aaDB].[..].[DimensionName.FieldName], where only the dimension name and field name would change depending on selection.

The following operators is provided in the Filter Expression editor: =, >, <, !=, <=, >=, AND, OR, LIKE, NOT, IN, IS NULL, IS NOT NULL, and Parenthesis. In addition to the operators provided in the Filter Expression editor, the user is able to write any syntactically valid SQL WHERE clause.

Figure 20:
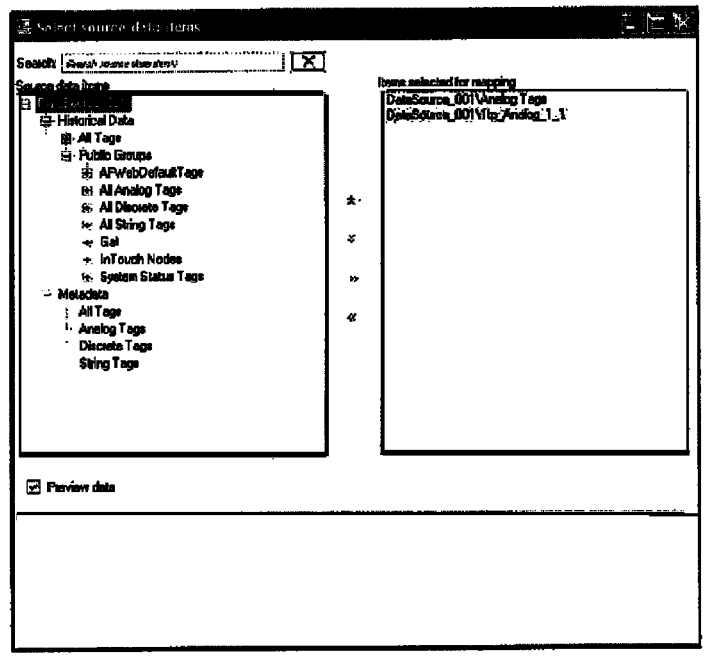
FIG. 20 is an exemplary user interface to designating data sources for providing information for the request processor in accordance with an exemplary embodiment.

Source Data Item Picker (FIG. 20)

Source data item selection is done in a screen that can be opened from either the Dimension or Measure editor. The exemplary interface displays in a tree view control the available data sources and their selected data source groups and data items based on the configured data source schema filter. The ability to preview the structure and/or data for each of the source data items is provided. When the user moves the mouse over a data source, a tool tip indicates the time stamp at which the last refresh was done.

When invoking the Source Data Item Picker from the measure editor, only one selection can be made. Making a second selection will overwrite the first one.

In order for a source data item to get to the mappings grid, the source data item has to be added to the list of source data items to be mapped.

For example, a source data item is configured and available for mappings.

SDI1
 Id, int
 Name, string
 Description, string

The user decides to add the source data item "SDI1" to Dimension "Dim1" for mappings.

Preview Data: By default, the preview data checkbox is not checked. When the preview data checkbox is not checked, then only the selected source data item fields are shown in the grid. Checking the "Preview Data" checkbox establishes a connection to the data source and displays in the grid a sample of the data corresponding to the selected source data item.

If no connection can be established, nothing is displayed and an error message notifies the user of the problem. The error message specifies which part of the operation failed. It can be the connection to the data source service, the connection to the source, or the retrieval of the source data item data.

Search:
 Source data items are filtered on a "contains" basis. This means defining "valid" as the search criteria will show source data items called "validSDI, "This_is_a_Valid_SDI" and "invalid".
 Search is not case sensitive.
 Search filter does not affect the data sources and the selected source data items.
 Source data items are filtered every time a letter is entered/remove in the search textbox. If this cause performance problems, filtering will happen when a button is pressed.
 Source data items for all data sources are filtered, not just the selected one.
 Pressing the red 'X' button empties the search textbox and reset the Source Data Items list.

Configuration information (data source, source data item and source data item fields) is persisted in the dimension or measure. This information is called the dimension or measure mappings and is part of the Intelligence Model to be deployed to the Intelligence server. When the dimension or measure editor is re-opened, it is populated with the current configuration.

In view of the many possible embodiments to which the principles of this disclosed computer system, which supports retrieving and navigating manufacturing data provided by sources across multiple networked sources, may be applied, it should be recognized that the embodiments described herein with respect to the drawing figures are meant to be illustrative only and should not be taken as limiting the scope of invention. For example, those of skill in the art will recognize that some elements of the illustrated embodiments shown in software, stored on physical computer-readable media in the form of computer executable instructions, may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A computer system including a non-transitory computer-readable medium having computer-executable instructions for processing manufacturing information requests, wherein the processing carried out by the computer system comprises the steps of:
   receiving an information request to retrieve information based on a named data item defined by a configured manufacturing data model;
   in response to the receiving step, relating data coming from at least one backend system and adding context data according to a definition of the named data item in the configured manufacturing data model, the context data defining a relevant scope of data corresponding to the information request, wherein the at least one backend system comprises a time-series data buffer and wherein the named data item is of a dimension quantifiable by time;
   configuring the named data item using a dimension-based time-slicing capability comprising a time-defining dimension wherein the time-defining dimensions further comprises time-defining fields consisting of either a start time and an end time or a start time and a duration and said time-defining fields are absolute time stamps for the named data item;
   preparing a result, corresponding to the information request, according to a specified format and filtering criteria;
   producing an information response in a normalized format, the information response containing the requested information and the context data corresponding to the information request; and
   transmitting the information response in the normalized format to a requestor.

2. The computer system of claim 1 wherein the definition of the named data item describes hierarchical relationships between a set of sub-data items.

3. The computer system of claim 2 wherein at least two sub-data items of the set of sub-data items are retrieved from distinct backend system data sources.

4. The computer system of claim 3 wherein the distinct backend system data sources are accessed via distinct data adaptors.

5. The computer system of claim 4 wherein the distinct backend system data sources comprise a relational database and the time-series data buffer.

6. The computer system of claim 1 wherein the result is stored in a data item cache of the manufacturing data model.

7. The computer system of claim 6 wherein the producing an information response step includes accessing the manufacturing data model to render the information response from the result and context data contained therein.

8. The computer system of claim 1 wherein the manufacturing data model further includes a navigation model that describes links between configured data items within the manufacturing data model.

9. The computer system of claim 8 wherein link descriptions specifying relationships between sub-data items of the named data item are included in the information response.

10. The computer system of claim 1 wherein the named data item specifies a metric, and wherein the context data specifies a time range over which a value for the metric is to be determined.

11. The computer system of claim 10 wherein the context data further specifies a set of equipment for which the metric is to be determined.

12. The computer system of claim 11 wherein the metric is overall efficiency of use of the set of equipment over the time range.

13. A method, carried out by a computer system including a non-transitory computer-readable medium having computer-executable instructions for processing manufacturing information requests, the method comprising the steps of:
   receiving an information request to retrieve information based on a named data item defined by a configured manufacturing data model;
   in response to the receiving step, relating data coming from at least one backend system and adding context data according to a definition of the named data item in the configured manufacturing data model, the context data defining a relevant scope of data corresponding to the information request, wherein the at least one backend system comprises a time-series data buffer, said time-series data buffer providing time-series data;
   and wherein the named data item is of a dimension quantifiable by time;
   configuring the named data item using a dimension-based time-slicing capability comprising a time-defining dimension wherein the time-defining dimensions further comprises time-defining fields consisting of either a start time and an end time or a start time and a duration and said time-defining fields are absolute time stamps for the named data item;
   preparing a result, corresponding to the information request, according to a specified format and filtering criteria;
   producing an information response in a normalized format, the information response containing the requested information and the context data corresponding to the information request, the information response further containing the provided time-series data; and
   transmitting the information response in the normalized format to a requestor.

14. The method of claim 13 wherein the definition of the named data item describes hierarchical relationships between a set of sub-data items.

15. The method of claim 14 wherein at least two sub-data items of the set of sub-data items are retrieved from distinct backend system data sources.

16. The method of claim 13 further comprising storing the result in a data item cache of the manufacturing data model.

17. The method of claim 16 wherein the producing an information response step includes accessing the manufacturing data model to render the information response from the result and context data contained therein.

18. The method of claim 13 wherein the manufacturing data model further includes a navigation model that describes links between configured data items within the manufacturing data model, and wherein the producing an information response step comprising adding link descriptions specifying relationships between sub-data items of the named data item.

19. The method of claim 13 wherein the named data item specifies a metric, and wherein the context data specifies a time range over which a value for the metric is to be determined.

20. The method of claim 19 wherein the context data further specifies a set of equipment for which the metric is to be determined.

* * * * *